April 3, 1934.   G. M. REED   1,953,822
ELECTRIC SWITCH GEAR
Filed Feb. 26, 1931   2 Sheets-Sheet 1

Inventor:
George M. Reed,
by Charles E. Tullar
His Attorney.

Patented Apr. 3, 1934

1,953,822

UNITED STATES PATENT OFFICE 1,953,822

ELECTRIC SWITCH GEAR

George M. Reed, Yeadon, Pa., assignor to General Electric Company, a corporation of New York Application February 26, 1931, Serial No. 518,458

15 Claims. (Cl. 175—298)

My invention relates to electric switchgear, more particularly to metal enclosed switchgear of the draw-out type wherein the movable or draw-out portion comprises a circuit breaker for controlling electrical circuits arranged in the stationary portion.

The principal object of my invention is the provision of improved metal enclosed switchgear of the draw-out type which shall be simple and rugged in construction and efficient and safe in operation.

My invention will be more fully set forth in the following description referring to the accompanying drawings, and the features of novelty which characterize my invention will be pointed out with particularity in the claims annexed to and forming a part of this specification.

Figure 1:
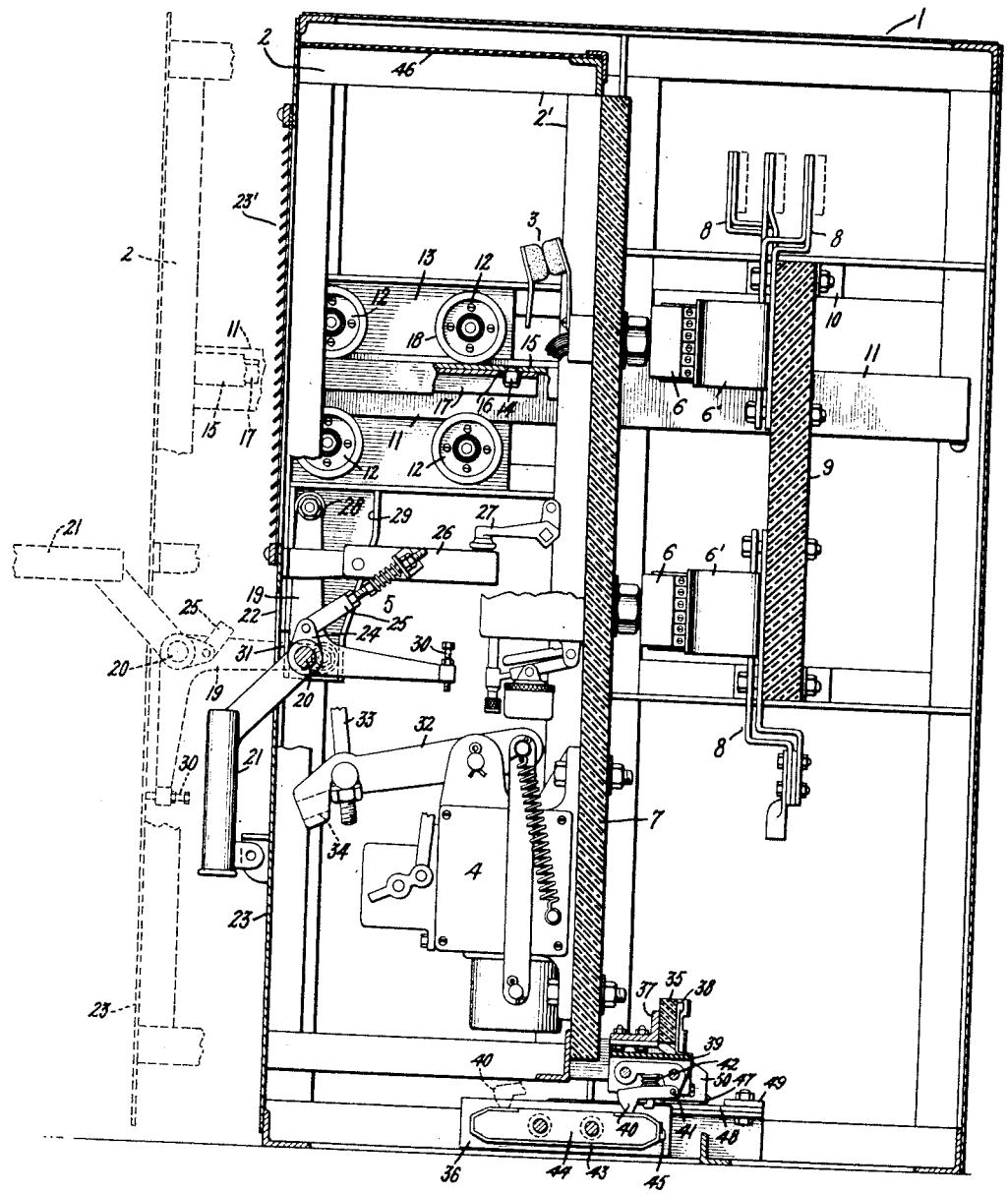
Figure 2:
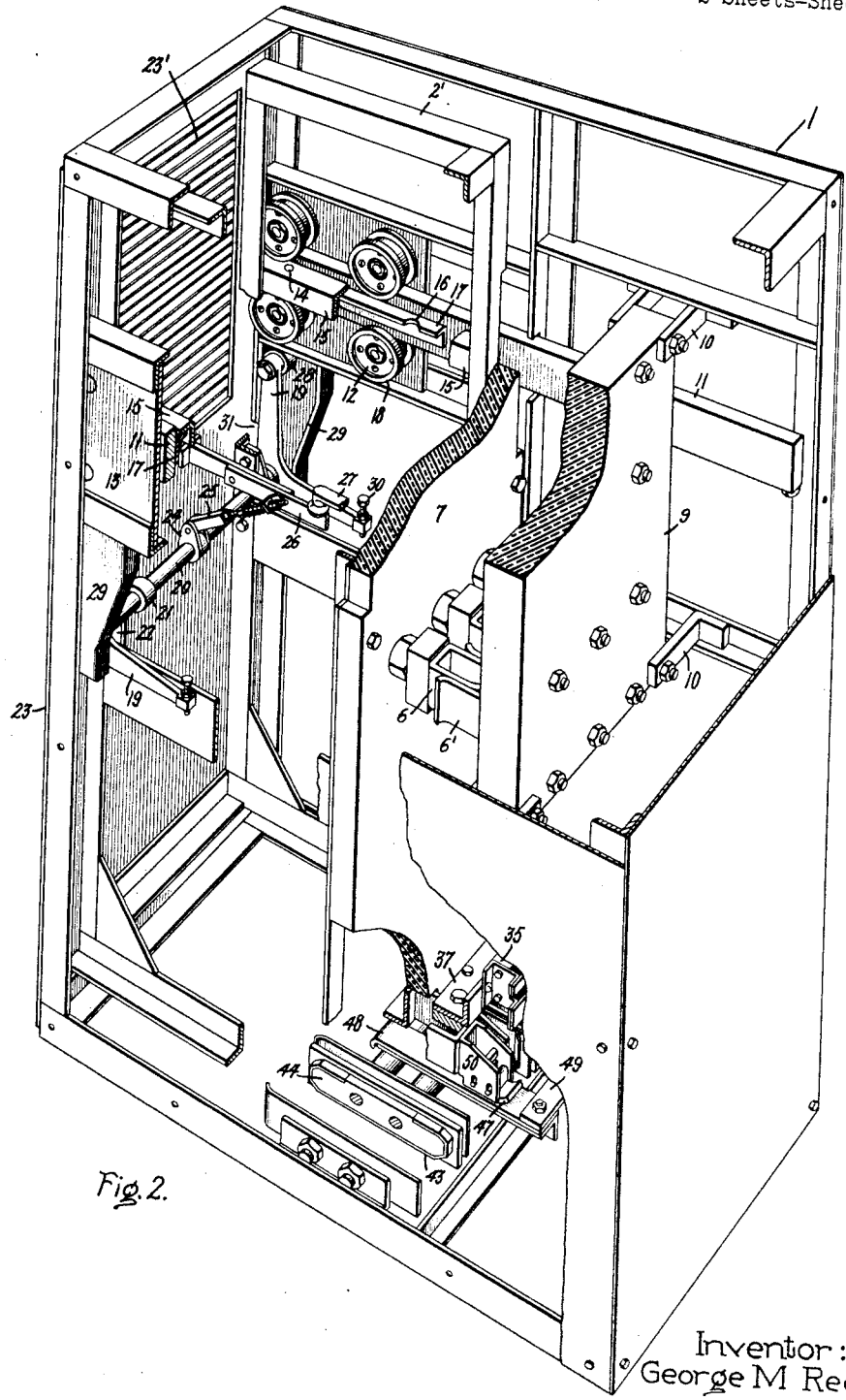

Referring to the drawings, Fig. 1 is an elevational, sectional view of metal enclosed switchgear embodying my invention and Fig. 2 is a perspective view, partly in section, of the apparatus illustrated in Fig. 1.

In metal enclosed switchgear of the draw-out or truck-panel type, the conventional arrangement comprises a stationary metal housing within which busbars, cable leads and accessory apparatus are disposed, and a removable unit comprising a circuit breaker which is suitably connected to the buses in the operative position of the unit. In this position so-called primary disconnecting contacts, comprising stationary contacts mounted with respect to the stationary housing and connected to the buses, and coacting movable contacts carried by the removable unit are in engagement. The apparatus is also provided with suitable interlocking means generally arranged so that it is impossible to withdraw the removable unit or break connection at the primary disconnecting contacts without first tripping the circuit breaker, thus insuring that the circuit breaker is open when the unit is moved out of and into operative position.

In switchgear of this type a further requisite is that the control connections for the circuit breaker provide for electrical operation of the same in the test or withdrawn position, and that the connections be inoperative when the unit is in intermediate positions between the test and fully "in" or operative position.

In an embodiment of my invention illustrated in Fig. 1 a stationary housing 1 arranged in the form of a cubicle having sheet metal walls supported by a frame of angle members is open at its front side to receive a removable unit 2 comprising a switch or circuit breaker indicated at 3, operating mechanism 4 for the circuit breaker, interlocking and draw-out mechanism generally indicated at 5 and primary disconnecting contacts 6. The primary disconnecting contacts 6, which may be of the resilient finger, self-aligning type for engaging the coacting stationary disconnecting contacts 6' as more clearly illustrated in Fig. 2, are mounted directly on the circuit breaker studs extending through the insulating panel 7 forming the rear side of the unit 2. Suitably mounted on the opposite side of the panel 7 are the circuit breaker 3 and the operating mechanism 4.

For the purposes of clearness and simplicity in the drawings, the busbars, cable leads, feeders and accessory apparatus are omitted in the stationary housing, it being sufficient to note that the busbar connections 8 are suitably connected to the stationary disconnecting contacts 6' which are mounted on the insulating panel 9. The panel 9 which is designed to occupy minimum space within the housing is suitably supported by the housing 1, as by the angle members 10 secured to the sides of the housing as illustrated in Fig. 2.

The removable unit 2 comprises an angle frame structure 2' having the insulating panel 7 suitably mounted on the rear side thereof and is guided and restrained in horizontal rectilinear motion during movement to disconnected and connected positions by bars 11 for supporting the opposite sides of the frame 2' of the removable unit. Each of the bars 11 is mounted and guided for sliding movement along the opposite sides of the housing 1 between two pairs of groved rollers 12, the edges of each bar being restrained in the grooves of the alined rollers. The rollers 12 are mounted for individual rotation on roller bearings carried by the supporting plate 13 in turn secured to the side frame of the housing 1. When the removable unit is in the connected or operative position, best illustrated in Fig. 2, each supporting bar 11 extends along the corresponding side of the housing 1 within suitable guides, the removable unit being supported both by the rollers 12 and by the guides. When the unit is withdrawn, the bars 11 slide outwardly between the rollers and support the unit at the outer ends thereof.

In the withdrawn position it is often desirable to remove the circuit breaker unit, and for this purpose there is provided means for positioning the circuit breaker unit with respect to the supporting bars 11 arranged so that the unit is locked to the stationary structure in the connected or fully "in" position and free to be removed from the bars in the withdrawn position. The arrangement for positioning the unit with respect to the bars comprises dowel pins or the like 14 secured to and depending from an angle member 15 secured to each side of the circuit breaker frame 2' and fitting into apertures or notches 16 formed in an angle member 17 which is secured to each of the bars 11 along the inner sides thereof. In the arrangement so far described the circuit breaker unit is positioned by lowering the breaker, as by crane and sling, into position on the extended bars so that the upper flange of the angle member 15 rests on the flange 17 with the pins 14 fitting in the notches 16. It will therefore be apparent that the unit may be readily removed or replaced by lifting the same from the bars when the same is withdrawn a sufficient distance from the housing 1. When however the unit is moved into the connected position, as illustrated in Fig. 2, the upper flange of the angle 15 rides underneath the pair of upper rollers 12 so that the circuit breaker is securely and firmly locked in position. The rollers 12 are so designed that their outer flanges 18 overhang and engage the angle 15 for the purpose above described. Accordingly, the circuit breaker when in operative position is rigidly secured and braced with respect to heavy short circuit stresses.

The draw-out and interlocking arrangement 5 comprises a pair of cranks 19 each secured to a shaft 20 rotatably mounted in the unit 2. The cranks are preferably disposed at opposite sides of the unit 2 adjacent the walls of the housing 1. The shaft 20 is provided with an operating handle 21 extending through a slot 22 in the front panel 23 of the unit 2. Likewise secured to the shaft 20 is a crank member 24 pivotally connected, through the link 25, with the interlock tripping member 26 which in turn is arranged to engage the tripping lever 27 of the circuit breaker 3. It will be noted that rotation of the member 24 in either direction towards its dead-center position is effective to rotate the trip lever 27 upwardly to trip the breaker.

When the removable unit 2 is to be withdrawn, the operating handle 21 is raised, thereby rotating the crank 19 in clockwise direction, as viewed in Fig. 1, causing the roller 28 mounted at the end of the crank to engage the cam structure 29 secured to the housing 1. The cam structure 29 comprises a metallic strip arranged so that the roller 28 does not engage the same until the corresponding rotation of the crank 24 rotates the trip member 26 upwardly to cause tripping of the circuit breaker. With the breaker tripped the unit may be immediately withdrawn which is effected by continued clockwise rotation of the crank 19. As the roller 28 engages the cam structure 29 and moves downwardly with respect thereto the unit is pushed outwardly until it reaches the dotted line position illustrated in Fig. 1, continued rotation of the shaft being prevented by the stop 30 carried by the crank 19. For the purpose of permitting the removable unit to be withdrawn entirely from the housing the frame of the housing comprising the front or "draw-in" part of the cam structure 29 is provided with a slot 31 which permits withdrawal and insertion of the roller 28 when in the dotted line position illustrated in Fig. 1. When however the crank 19 is in other than the normally isolating position shown in the dotted line the frame of the stationary housing prevents either withdrawal or moving in of the unit 2. Accordingly, there is no possibility of rolling in the unit with the circuit breaker closed since the crank 19 must first be rotated to the dotted line position in order that the roller 28 may enter the cam structure 29. With the roller within the opposing portions of the cam structure, counterclockwise rotation of the shaft 20 causes the tripping linkage, in moving towards dead-center, to actuate the trip lever 27, and movement of the unit after the tripping operation to the "in" position. The initial tripping movement of the shaft 20 prior to the actual camming operations may be approximately 20°.

In view of the fact that the circuit breaker 3 and the operating mechanism 4 may be of any well known and suitable type, it is not believed necessary to describe these in detail other than to state that the operating mechanism 4 may comprise a solenoid operatively connected to the breaker through the lever 32 and link 33. Manual operation may be had by inserting an operating handle through a slot (not shown) in the panel 23 to engage the socket 34 in the lever 32.

The secondary or control connections for electrically operating the circuit breaker in both the operative and test positions comprise a terminal block 35 carried by the movable unit 2 and stationary contact structure 36 mounted at the lower part of the housing 1. The terminal block 35 is carried by an angle member 37 suitably secured to the unit 2 and has mounted thereon the terminal connections 38 for the secondary control leads in turn connected through a flexible conductor 39 to the movable secondary contacts 40. Each of the contacts 40 is pivotally mounted at 41 in insulating supporting structure carried by the angle 37 and is resiliently biased downwardly by a spring 42 to engage the coacting stationary secondary contact 43. The contact 43 comprises a conducting strip mounted on an insulating block 44 in the form of an incomplete loop so that the ends of the strip are separated by the insulation along the upper surface of the block. Each of the secondary contacts 43 is provided with a terminal lug 45 for connection with the corresponding secondary leads. The secondary leads are omitted for the purpose of clarity since these circuits are well known and form no part of the present invention. It will be noted that the control circuits are completed when the unit 2 is in the operative position as illustrated so that the circuit breaker may be electrically operated in the usual manner. When however the unit 2 is withdrawn the secondary contact 40 slides out of engagement with the contact 43 and rides along the edge of the insulating block to disconnect the secondary circuits. It is therefore impossible to electrically operate the circuit breaker in an intermediate position of the unit. When the unit is withdrawn so that the primary disconnecting contacts are separated by a safe distance, the secondary contact 40 engages the opposite end of the contact 43 as illustrated in dotted lines so that the circuit breaker may be electrically operated in test position.

With the unit 2 in the operative position, the front panel 23 completely closes the front of the housing 1 so as to form therewith a metal enclosed cubicle. The panel 23 may likewise have mounted on the front wall thereof suitable metering or control devices (not shown). Also, the panel 23 is preferably provided with ventilating louvers 23' of insulating material disposed opposite the circuit breaker 3 so that the interior of the housing may be cleared of gases incident to interruption of the circuit without allowing emission of flame during arcing. The louvers 23' cover a rectangular opening of corresponding size in the steel panel 23 thereby minimizing flashover to the panel 23. For preventing flashover during interruption of a heavy short circuit for example, the side walls of the unit adjacent the circuit breaker are also provided with sheets of insulation (not shown) and the top is provided with a sheet of suitable insulating material 46. Likewise, insulating barriers (not shown) are disposed in the usual manner between the phase units of the circuit breaker.

In metal enclosed gear it is generally a requisite that the metal framework for the apparatus be grounded. For this purpose there is provided a grounding contact 47 (Fig. 2) carried by the removable unit 2 and resiliently biased to make sliding engagement with a stationary grounding contact 48 which is suitably connected to a ground bus 49. The sliding grounding contact 47 is pivotally mounted within the U-shaped frame 50 and is arranged to ground the metal frame of the movable unit during its movement to the withdrawn position.

The metal enclosed switchgear above described is readily installed since the entire apparatus may be factory-built and similar equipments may be arranged in a row to form a switchboard of uniform and neat appearance. By reason of the complete enclosure of each individual circuit there is less fire hazard from sources both within and external to the switchgear. Furthermore, safety to attendants is assured by the fact that all primary live apparatus is completely enclosed at all times. Repairs or replacements of the switch unit can be made only after the movable unit is withdrawn and disconnected from the live parts of the circuit.

During the usual time required for maintenance and inspection of the removable unit, a faulty or damaged unit can be quickly withdrawn and replaced by a spare unit. The quick and ready replacement of faulty units is obviously an important consideration in continuity of service.

It should be understood that my invention is not limited to specific details of construction and arrangement thereof herein illustrated, and that changes and modifications may occur to one skilled in the art without departing from the spirit of my invention.

What I claim as new and desire to secure by Letters Patent of the United States, is:

1. Electrical switchgear of the draw-out type comprising a stationary housing having electrical circuits therein, an electrical switch unit movable horizontally into and out of said housing, and means for supporting said unit and for guiding the same in horizontal rectilinear movement comprising bars movable with said unit and slidably mounted and guided in said stationary housing.

2. Electrical switchgear of the truck-panel type comprising a stationary housing having bus bar connections mounted therein, a switch unit movable with respect to said housing, said switch unit having contacts for engaging corresponding bus bar connections, means for supporting and guiding said switch unit in horizontal rectilinear movement into and out of said housing including a bar for supporting said switch unit, said bar being slidably mounted within said stationary housing so that said switch unit may be withdrawn to an isolating position with respect to said bus bar connections.

3. Electrical switchgear of the truck-panel type comprising a stationary bus bar supporting structure, a switch unit movable with respect to said structure, disconnecting contacts for connecting said switch unit with said bus bars, means for supporting and guiding said switch unit in rectilinear movement to operative and isolating positions comprising a pair of bars slidably mounted within said bus bar supporting structure, said switch unit being supported at and between the ends of said bars.

4. Electrical switchgear of the truck-panel type comprising a stationary bus bar supporting structure, a switch unit movable with respect to said structure, disconnecting contacts for electrically connecting said switch unit to said bus bars in the operative position of said unit, means for supporting and guiding said switch unit in rectilinear movement to operative and isolating positions comprising a pair of bars slidably mounted within said stationary structure, said switch unit being detachably supported at the outer end of said bars whereby said switch unit may be readily removed from said bars in the isolating position.

5. In electrical switchgear of the truck-panel type comprising stationary bus bar supporting structure and a switch unit movable with respect thereto to operative and isolating positions, means for supporting and guiding said switch unit in horizontal rectilinear movement including a bar slidably mounted within said stationary structure, said switch unit being detachably mounted with respect to said bar in the isolated position, and means slidably supporting said bar operative to secure said switch unit rigidly with respect to said stationary structure in the operative position of said unit.

6. In electrical switchgear of the truck-panel type comprising stationary bus bar supporting structure and a switch unit movable to operative and isolating positions with respect thereto, means for supporting and guiding said switch unit in rectilinear movement comprising a pair of bars slidably mounted within said stationary structure, supporting flanges secured to said bars upon which said switch unit is mounted, said flanges having apertures for receiving positioning lugs mounted on said switch unit whereby said switch unit may be lifted from said bars in the isolated withdrawn position thereof.

7. Electrical switchgear of the truck-panel type comprising stationary bus bar supporting structure and a switch unit movable to operative and isolating positions with respect thereto, means for supporting and guiding said unit in rectilinear movement comprising a pair of bars, rollers mounted within said stationary structure for slidably supporting said bars, said unit resting on and removable from said bars in the isolated position of the unit, said rollers coacting with said unit for rigidly holding the same in position in the operative position of said unit.

8. Electrical switchgear of the truck-panel type comprising stationary bus bar supporting structure and a switch unit movable to operative and isolating positions with respect thereto, means for supporting and guiding said unit in rectilinear movement comprising a pair of bars provided at the outer ends thereof with flanges for supporting said unit, rollers mounted in said stationary structure between which said bars are slidably supported, said rollers being provided with flanges overlying the supporting structure of said unit in the operative position for rigidly locking said unit in that position.

9. Interlocking and draw-out mechanism for electric switchgear including a circuit breaker unit movable in a rectilinear path to operative and isolated position comprising an operating shaft mounted in and carried by said unit, a crank fixed to said shaft and having a cam portion at the free end thereof, stationary cam structure arranged to coact with said cam portion, said crank coacting with said stationary cam structure to cause movement of said unit to its isolated position when the crank is rotated in one direction and movement of the unit to its operative position when said crank is rotated in the opposite direction, means operatively connected to said shaft for causing tripping of the circuit breaker during the initial movement of said shaft in either of said directions whereby said circuit breaker is in open circuit position during movement of said unit from and to its operative position.

10. Interlocking and draw-out mechanism for electric switchgear including a circuit breaker unit movable in a rectilinear path to operative and isolated positions comprising an operating shaft mounted in and carried by said unit, a crank fixed to said shaft having a camming roller mounted on the free end thereof, stationary cam structure having opposing cam faces coacting with said roller, rotation of said shaft in one direction causing movement of said unit to its isolated position, and rotation in the opposite direction causing movement of said unit to its operative position, and linkage structure operatively connected to said shaft to cause tripping of the circuit breaker during initial movement of said shaft in either direction and prior to camming engagement of said roller with the corresponding face of said stationary cam structure.

11. Interlocking and draw-out mechanism for electric switchgear including a circuit breaker unit movable in a rectilinear path to operative and isolated positions, comprising an operating shaft mounted in and carried by said unit, a crank fixed on said shaft and having a camming roller at one end thereof, a stationary cam structure engaged by said roller during rotation of said shaft substantially 90° in one direction to cause withdrawal of said unit to its isolating position and during rotation in the opposite direction to cause movement of said unit to its operative position, linkage structure operatively connected to said shaft for causing tripping of said circuit breaker upon initial rotation of said crank in either direction, said camming roller being spaced from said stationary cam structure in both the operative and isolated positions of said unit for insuring tripping of said breaker prior to movement of said unit, said cam structure being provided with an opening for permitting withdrawal of said camming roller therefrom only when said crank is in a predetermined position.

12. Electrical switchgear of the draw-out type comprising a stationary housing having bus bar connections therein, a circuit breaker unit movable in a rectilinear path between operative and isolating positions, draw-out and interlocking mechanism for said unit comprising an operating shaft mounted in and carried by said unit, a pair of cam levers fixed to said shaft and disposed at opposite sides of said unit, stationary cam structure mounted at opposite sides of said housing coacting with each of said cam levers, said stationary cam structure having opposing cam faces arranged in spaced relation for engagement with said cam levers so that the coacting cam lever has a limited lost motion with respect thereto during a portion of its operating cycle, and linkage structure pivotally connected to said shaft arranged to cause tripping of the circuit breaker during said lost motion travel of said cam lever.

13. In electrical switchgear of the draw-out type comprising stationary bus bar supporting structure and an electrically controlled circuit breaker unit movable in a rectilinear path between operative and isolating positions, secondary contact structure for the control circuits of said breaker comprising terminal structure carried by said unit, a contact mounted thereon and coacting stationary contact structure comprising a single strip of conducting material arranged in the form of an incomplete loop for completing a control circuit only in the operative and isolated positions of said unit.

14. In electrical switchgear of the draw-out type comprising stationary bus bar supporting structure and an electrically controlled circuit breaker unit movable in a rectilinear path between operative and test positions, secondary contact structure for the control circuits of said breaker comprising terminal structure carried by said unit, a resiliently biased contact mounted thereon, coacting stationary contact structure arranged to make sliding engagement with said resilient contact comprising an insulating block and a conducting strip mounted upon said block forming an incomplete loop, said resilient contact engaging one portion of said strip in the operative position of said unit, said insulating block in an intermediate position of said unit, and another portion of said strip in the test position.

15. Electrical switchgear of the truck-panel type comprising a stationary frame having bus bar connections mounted thereon, a movable switch unit coacting with said connections, a pair of bars slidably mounted in said frame supporting and guiding said unit for horizontal, rectilinear movement to connected and disconnected positions with respect to said bus bar connections, said bars detachably supporting said unit exteriorly of said frame in the disconnected position of the unit, and means comprising a part of said frame rigidly securing said unit to said bars when said unit is within said frame in the connected position.

GEORGE M. REED.